US007970883B2

(12) United States Patent
Yoshikai et al.

(10) Patent No.: US 7,970,883 B2
(45) Date of Patent: Jun. 28, 2011

(54) COMMUNICATION NETWORK DESIGNING METHOD, COMMUNICATION DESIGNING APPARATUS, AND RECORDING MEDIUM

(75) Inventors: Noriaki Yoshikai, Tokyo (JP); Jun Kanemitsu, Tokyo (JP)

(73) Assignee: Nihon University, Tokyo (JP)

( * ) Notice: Subject to any disclaimer, the term of this patent is extended or adjusted under 35 U.S.C. 154(b) by 211 days.

(21) Appl. No.: 12/301,638

(22) PCT Filed: May 16, 2007

(86) PCT No.: PCT/JP2007/060075
§ 371 (c)(1),
(2), (4) Date: Nov. 20, 2008

(87) PCT Pub. No.: WO2007/135931
PCT Pub. Date: Nov. 29, 2007

(65) Prior Publication Data
US 2009/0259441 A1    Oct. 15, 2009

(30) Foreign Application Priority Data

May 24, 2006    (JP) .................................. 2006-144277

(51) Int. Cl.
*G06F 15/173* (2006.01)
(52) U.S. Cl. ......... 709/223; 709/224; 709/203; 709/217
(58) Field of Classification Search .................. 709/203, 709/217, 219, 223, 224
See application file for complete search history.

(56) References Cited

U.S. PATENT DOCUMENTS

| 7,167,910 | B2 * | 1/2007 | Farnham et al. .............. 709/223 |
| 7,529,797 | B2 * | 5/2009 | Tseng et al. .................. 709/204 |
| 7,747,648 | B1 * | 6/2010 | Kraft et al. .................... 707/790 |
| 2006/0248573 | A1 * | 11/2006 | Pannu et al. ....................... 726/1 |
| 2007/0192461 | A1 * | 8/2007 | Reich et al. ................... 709/223 |
| 2007/0226248 | A1 * | 9/2007 | Darr ............................... 707/102 |
| 2007/0255807 | A1 * | 11/2007 | Hayashi et al. ............... 709/219 |
| 2007/0260725 | A1 * | 11/2007 | McCuller ...................... 709/224 |

(Continued)

FOREIGN PATENT DOCUMENTS

JP    5-268245 A    10/1993
(Continued)

OTHER PUBLICATIONS

Shakai Network Bunseki No Kiso (Fundamental Social Network Analysis for Social Capital), by Kanemitsu, Dec. 20, 2003, Keiso Shobo, pp. 140-141.
"Social Network to Joho Network no Renkei ni Kansuru Kosatsu", Yoshikai, 2006, The Institute of Electronics, Information and Communication Engineers Sogo Taikai Koen Ronbunshu (Tsushin 2), The Institute of Electronics, Information and Communication Engineers, Mar. 8, 2006, p. 259.

(Continued)

*Primary Examiner* — Lashonda T Jacobs
(74) *Attorney, Agent, or Firm* — Ohlandt, Greeley, Ruggiero & Perle, LLP

(57) ABSTRACT

The present invention is to provide a communication network designing method based on an actual condition of social network structured on a communication network, a communication network designing program, and a recording medium on which the program is recorded.
A communication network designing method executed by a communication network designing apparatus which is connected to a communication network in which a plurality of communication terminals are connected to each other and which designs the communication network is characterized in that a social network formed on the communication network is analyzed, and the communication network is designed on the basis of the analysis result.

19 Claims, 11 Drawing Sheets

U.S. PATENT DOCUMENTS

| | | | | |
|---|---|---|---|---|
| 2008/0270615 | A1* | 10/2008 | Centola et al. | 709/228 |
| 2009/0265106 | A1* | 10/2009 | Bearman et al. | 701/300 |
| 2010/0185610 | A1* | 7/2010 | Lunt et al. | 707/727 |

FOREIGN PATENT DOCUMENTS

| | | |
|---|---|---|
| JP | 11-68750 A | 3/1999 |
| JP | 2002-300206 A | 10/2002 |

OTHER PUBLICATIONS

"Network no Kachi ni Kansuru Kosatsu", Yoshikai, 2005, IEICE Communications Society Taikai Koen Ronbunshu (2), The Institute of Electronics, Information and Communication Engineers, Sep. 7, 2005, p. 146.

* cited by examiner

|  |  | MODEL 1 | MODEL 2 |
|---|---|---|---|
| USER OF COMMUNICATION TERMINAL | a | 1 | 3 |
|  | b | 1 | 3 |
|  | c | 3 | 6 |
|  | d | 3 | 7 |
|  | e | 2 | 3 |
|  | f | 2 | 4 |
|  | g | 2 | 3 |
|  | h | 3 | 5 |
| NETWORK GROUP | A | 4 | 4 |
|  | B | 3 | 5 |
|  | C | 2 | 3 |
|  | D | 3 | 4 |
|  | E | 2 | 3 |
|  | F | 3 | 5 |

FIG. 4

|  |  | MODEL 1 | MODEL 2 |
|---|---|---|---|
| USER OF COMMUNICATION TERMINAL | a | 0 | 0 |
|  | b | 0 | 0 |
|  | c | 17.25 | 3.833 |
|  | d | 22.5 | 6.333 |
|  | e | 6 | 0.333 |
|  | f | 3.25 | 0.333 |
|  | g | 6.833 | 0.833 |
|  | h | 12.1667 | 1.333 |
| NETWORK GROUP | A | 25.588 | 0.333 |
|  | B | 14.167 | 1.333 |
|  | C | 4.677 | 0.333 |
|  | D | 9.917 | 0.833 |
|  | E | 8.833 | 0.833 |
|  | F | 17.833 | 1.333 |

COMMUNICATION NETWORK DESIGNING METHOD, COMMUNICATION DESIGNING APPARATUS, AND RECORDING MEDIUM

CROSS-REFERENCE TO PRIOR APPLICATION

This is the U.S. National Phase Application under 35 U.S.C. §371 of International Patent Application No. PCT/JP2007/060075 filed May 16, 2007, which claims the benefit of Japanese Patent Application No. 2006-144277 filed May 24, 2006, both of which are incorporated by reference herein. The International Application was published in Japanese on Nov. 29, 2007 as WO2007/135931 A1 under PCT Article 21(2).

TECHNICAL FIELD

The present invention relates to a communication network designing method that corrects various pieces of information constituting a communication network and design the communication network on the basis of the corrected pieces of information, a communication network designing program, and a recording medium in that the program is stored.

BACKGROUND ART

A communication network designing system that changes an operating method of a communication network and a communication network configuration on the basis of the configuration and an operation state of the communication network is proposed (for example, see Patent Documents 1 to 3.).

FIG. 8 is a block diagram showing an example of a conventional communication network designing system. A communication network designing apparatus 88 configured by a user interface 81, a network information collecting unit 83, a network designing unit 85, a network database 86, a network setting unit 87, and a network information collection determining unit 82 is connected to a communication network 89. The network information collecting unit 83 collects pieces of network information such as an operation state of the communication network 89 and stores the information in the network database 86. At this time, in order to prevent collected data from being large in a large-scale network, network operation state information required for communication network design restrictively collected by a designation from the network information collection determining unit 82. The user interface 81 accepts a request condition such as service quality from a network administrator and priorities of links. The network designing unit 85 proposes design or design change of the communication network 89 to satisfy a request condition from a user on the basis of the network information stored in the network database 86. The network setting unit 87 performs a setting or a setting change of the communication network 89 on the basis of proposal contents from the network designing unit 85.

On the other hand, a social networking site (SNS or YASNS) operated by a network group to structure a social network on a communication network is provided. At the social working site, a function of exposing an address or a profile of a member participating in a social network on a communication network or a function of forming a new social association are provided.

[Patent Document 1] Japanese Patent Application Laid-Open (JP-A) No. 2002-300206
[Patent Document 2] JP-A No. 05-268245
[Patent Document 3] JP-A No. 11-068750

DISCLOSURE OF THE INVENTION

Problem to be Solved by the Invention

However, conventional communication network design has a problem in that a social network configured between users is not considered in a service request condition serving as a condition of the communication network design. The social network is structured as needed by a purpose or an activity style of a network group in which a user participates and naturally grown. For this reason, in general, a network administrator or, depending on cases, a user herself/himself cannot be aware of a configuration of a social network in which the user participates. By only network information used in the conventional communication network design, it is difficult to recognize a social network actually structured on the communication network.

In a network group, a nominal leader may be different from a substantial reader, or an agential (broker) member who is not a leader may be present. In communication network design, the network group cannot be smoothly operated without being aware of such an important member. For example, in a network group for a project of a certain company, a class of user information is determined in advance depending on an in-company position of a member. In traffic management on a communication network, a priority is frequently assigned depending on a class of user information and operated. However, as an actual project progressed, substantial determination is performed, many pieces of information are collected for a member who behaves in a responsible manner, and a core member takes the central role in a network group is determined independently of an in-company position. When the core member is disconnected on the communication network, an activity of the network group is substantially stopped, a network link to the core member must be redundantly secured at high reliability. In information management and a transfer algorithm in the communication network, traffic and reliability must be designed in consideration of the fluctuation or reliability to make an organizational activity on the communication network smooth. However, as a conventional communication network design, a communication network design cannot be performed in consideration of an important member in the social network.

The present invention has as its object to provide a communication network designing method based on an actual condition of a social network structured on a communication network, a communication network designing program, and a recording medium in which the program is stored.

Means for Solving the Problems

The present invention is a method of designing a communication network executed by a communication network designing apparatus that is connected to the communication network in which a plurality of communication terminals are connected to each other and designs the communication network, characterized in that a social network formed on the communication network is analyzed, and the communication network design is performed on the basis of an analysis result. The social network mentioned here is a human network formed by a plurality of members engage in a social activity.

Social networks are formed at multiple levels between members. Each social network has a certain function.

More specifically, a communication network designing method according to the present invention is a communication network designing method in that a communication network having a communication apparatus which contains a communication terminal and a transmission path which connects the communication apparatuses to each other is designed by a communication network designing apparatus connected to the communication network, characterized in that an information storing unit of the communication network designing apparatus includes: the information storing step of acquiring and storing social activity information representing an association between the communication terminals to each other on the communication network by an information storing unit of the communication network designing apparatus; the analyzing step of performing a social network analysis by a social network analyzing unit of the communication network designing apparatus on the basis of the social activity information stored in the information storing step; and the designing step of designing the communication network on the basis of an analysis result of the social network analysis performed in the analyzing step.

The communication terminals mentioned here are communication terminals that acquire different pieces of identification information in units of users who use the communication terminals. For this reason, although the communication terminals are physically identical machines, the communication terminals serve as different terminals for different users. The social activity information representing an association between the communication terminals is information representing that one communication terminal performs transmission, reception, or transmission/reception with another communication terminal to have some relationship.

The communication network designing method according to the present invention further includes the social activity information collecting step of collecting the social activity information from the communication apparatus through the communication network by an information collecting unit of the communication network designing apparatus before the information storing step, wherein, in the information storing step, the information storing unit preferably acquires and stores the social activity information collected in the social activity information collecting step from the information collecting unit. When the communication network designing method includes the social activity information collecting step, information about occurrence or elimination of an association between the communication terminals can collect as the social activity information on real time. In this manner, when the communication network designing method further includes the social activity information collecting step, a communication network which reflects an actual condition of a social network can be designed.

In the communication network designing method according to the present invention, in the social activity information collecting step, the information collecting unit transmits a social activity information transmission request representing that the social activity information is requested to the communication apparatus to transmit a transmission source and a transmission destination included in header information of a packet received from the communication terminal contained in the communication apparatus, and the transmission source and the transmission designation transmitted from the communication apparatus are preferably collected as the social activity information. The information correcting unit collects the transmission source and the transmission destination to make it possible to collect information representing which communication terminal is associated with a specific communication terminal as the social activity information.

In the communication network designing method according to the present invention, in the social activity information collecting step, the information collecting unit transmits a social activity information transmission request representing that the social activity information is requested to the communication apparatus to transmit an amount of traffic included in header information of a packet received from the communication terminal contained in the communication apparatus together with the transmission source and the transmission destination to the communication apparatus, and the transmission source, the transmission destination, and the amount of traffic transmitted from the communication apparatus are preferably collected as the social activity information. The information collecting unit collects, in addition to the transmission source and the transmission destination, the amount of quantity to make it possible to perform weighting depending on the amount of traffic in the analyzing step. In this manner, in the designing step, the communication network designing apparatus can design a communication network depending on the amount of traffic transmitted between the communication terminals.

In the communication network designing method according to the present invention, in the information storing step, the information storing unit stores combinations between the communication terminals which perform transmission/reception through the communication network as the social activity information in units of the communication terminals, and, in the analyzing step, the social network analyzing unit forms an adjacent matrix directly representing a relation between the communication terminals on the basis of a combination between the communication terminals and calculates a centrality of the social network formed by the plurality of communication terminals on the basis of the adjacent matrix to preferably perform the social network analysis. In this case, the centrality of the social network is an index representing the degree of centrality of each communication terminal or the degree of termination of the communication terminal in the social network formed by transmitting/receiving information on the communication network. When the centrality of the social network is calculated on the basis of the adjacent matrix directly representing the relation between the communication terminals, a communication terminal which takes the central role in the actual social network which does not have a unique site or a network group of a registration system can be specified. When the communication network is designed on the basis of the analysis result, an efficient communication network can be designed depending on an activity situation of each communication terminal.

In the communication network designing method according to the present invention, in the information storing step, the information storing unit stores combinations between network groups configured by the plurality of communication terminals on the communication network and the communication terminals constituting the network group as the social activity information in units of the communication terminals, and in the analyzing step, the social network analyzing unit forms an adjacent matrix which directly represents a relation between the network group and the communication terminal on the basis of the combination between the network group and the communication terminal and calculates a centrality of the social network formed by the plurality of communication terminals to preferably analyze the social network. When the centrality of the social network is calculated on the basis of the adjacent matrix which directly represents the relation between the network group and the communication terminal, a communication terminal which constitute a network group takes the central role in social network groups formed on the communication network can be specified. When a communication network is designed on the basis of the analysis result, an efficient communication network can be designed depending on an activity state of the network group.

In the analyzing step, the social network analyzing unit extracts a set of communication terminals which form a complete graph, and the extracted set is preferably handled as the network group. In this case, the complete graph is a set in which terminals are connected to each other by one or more link. An actual network group which is not registered in advance can be extracted.

In the communication network designing method according to the present invention, in the designing step, the network designing unit, with respect to the communication apparatus which contains the communication terminal having the high centrality calculated in the analyzing step, in comparison with the communication terminal having the low centrality calculated in the analyzing step, can preferably design the communication network which makes an order of performing transmission from the communication apparatus to the transmission path higher, or increases the number of different routes of the transmission path transmitted from the communication apparatus, or decreases the number of links of the transmission path to a transmission destination, or arranges a mirror server.

When the order of performing transmission from the communication apparatus to the transmission path is made higher, a time for transmitting information by the communication apparatus can be shortened, and the probability of causing the communication apparatus to transmit information can be increased. When the number of different routes of transmission paths transmitted from the communication apparatus is increased, the probability of causing the information transmitted from the communication apparatus to reach a communication terminal serving as a transmission destination can be increased. When the number of links of the transmission paths to the transmission destination is decreased, the number of relay communication apparatuses can be reduced. For this reason, a time required to transmit information to the communication terminal serving as the transmission destination can be shortened. When the mirror server is arranged, a load generated when accesses to transmission traffic from peripheral communication apparatuses are concentrated can be distributed.

Therefore, in the designing step, as a setting of the communication apparatus which contains a communication terminal having a high centrality in the social network, to information transmitted from the communication terminal having a high centrality in the social network, an order of performing transmission from the communication apparatus to the transmission path is made high, or a large number of different routes of transmission paths transmitted from the communication apparatus are set, or a number of links of the transmission path to the transmission destination are set, so that the information transmitted from the communication terminal having a high centrality in the social network can be efficiently transmitted. For this reason, the communication network can be designed as an efficient communication network depending on an activity status of a communication terminal or a network group.

In the communication network designing method according to the present invention, in the information storing step, the information storing unit stores, as the social activity information, combinations between the communication terminals which perform transmission/reception through the communication network in units of the communication terminals, and, in the analyzing step, the social network analyzing unit forms an adjacent matrix which directly represents a relation between the communication terminals on the basis of the combination between the communication terminals and calculates a weakness of the social network formed by the plurality of communication terminals on the basis of the adjacent matrix to preferably perform the social network analysis. In this case, the weakness of the social network is an index representing a magnitude of influence on the social network when a failure occurs in communication between the communication terminals or the network groups in the social network formed by transmitting and receiving information between the communication terminals on the communication network. When the weakness of the social network is calculated on the basis of the adjacent matrix which directly represents the relation between the communication terminals, a user who takes an intermediary role in an actual social network which does not have a unique site or a network group of a registration system can be specified. When the communication network is designed on the basis of the analysis result, deterioration of a communication function of an entire communication network caused by a drawback of a communication function of a specific communication terminal can be prevented from occurring. Therefore, the communication network can be designed as a safe communication network depending on an activity status of each communication terminal can be designed.

In the communication network designing method according to the present invention, in the information storing step, the information storing unit stores, as the social activity information, combinations between a network group configured by the plurality of communication terminals on the communication network and the communication terminals constituting the network group in units of the communication terminals, and, in the analyzing step, the social network analyzing unit forms an adjacent matrix which directly represents a relation between the network group and the communication terminals on the basis of a combination between the network group and the communication terminal, and a weakness of a social network formed by the plurality of communication terminals is calculated on the basis of the adjacent matrix to preferably perform the social network analysis. When the weakness of the social network is calculated on the basis of an adjacent matrix which directly represents the relation between the network group and the communication terminal, a network group which takes an intermediary role in the network groups formed on the communication network can be specified. When the communication network is designed on the basis of the analysis result, a communication function in the entire communication network can be prevented from occurring from being deteriorated by a defective communication function in a specific communication terminal or a network group. Therefore, a safe communication network depending on an activity status of a network group can be designed.

In the communication network designing method according to the present invention, in the designing step, the network designing unit, with respect to the communication apparatus which contains the communication terminal having the high weakness calculated in the analyzing step, in comparison with the communication terminal having the low weakness calculated in the analyzing step, makes an order of performing transmission from the communication apparatus to the transmission path high or increases the number of different routes of the transmission paths transmitted from the communication apparatus, so that the communication network is preferably designed.

When the order of performing transmission from the communication apparatus to the transmission path is made high, a time required for causing the communication apparatus to transmit information can be shorted, and the probability of causing the communication apparatus to transmit information can be increased. When the number of different routes of the transmission paths transmitted from the communication apparatus is increased, the probability of causing the information transmitted from the communication apparatus to reach a communication terminal serving as a transmission destination can be increased. When the number of links of the transmission paths to the transmission destination is decreased, the number of relay communication apparatuses can be reduced. For this reason, a time required to transmit information to the communication terminal serving as the transmission destination can be shortened.

In the designing step, as a setting of a communication apparatus which contains a communication terminal having a high weakness, to information transmitted from the communication terminal having the high weakness, an order of performing transmission from the communication apparatus to the transmission path is set to be high, the number of different routes of the transmission paths transmitted from the communication apparatus is set to be large, or the number of links of the transmission paths to the transmission destination is set to be small, so that information transmitted from the communication terminal having the high weakness can be efficiently transmitted. For this reason, as the communication network, a safe communication network depending on an activation state of a communication terminal or a network group can be designed.

In the communication network designing method according to the present invention, in the information storing step, the information storing unit stores amounts of traffic of transmission/reception of the communication terminals in units of the communication terminals, and in the analyzing step, the social network analyzing unit preferably performs weighting depending on the amounts of traffic to the adjacent matrix. Even in a communication terminal having a high centrality or a high weakness in a social network, an amount of traffic of transmission/reception changes depending on roles in the social network. When the amount of traffic of transmission/ reception of the communication terminal is reflected on the centrality or weakness of the social network, a communication network which can secure a sufficient communication capacity to the communication terminal having the high centrality or high weakness of the social network can be designed.

A communication network designing program according to the present invention is a program to execute the communication network designing method according to the present invention.

A recording medium according to the present invention is a computer readable recording medium on which the communication network designing program according to the present invention is recorded.

Effect of the Invention

The present invention performs a social network analysis from an association between communication terminals on a communication network to make it possible to clarify an actual condition of a social network structured on the communication network. Therefore, when the communication network is designed on the basis of an analysis result of the social network analysis, communication network design based on an actual state of the social network structured on the communication network can be performed.

BRIEF DESCRIPTION OF THE DRAWINGS

FIG. 4 is a calculation result of a degree centrality in the social network shown in FIG. 3.
FIG. 5 is a calculation result of a betweenness in the social network shown in FIG. 3.

REFERENCE NUMERALS

Figure 1:
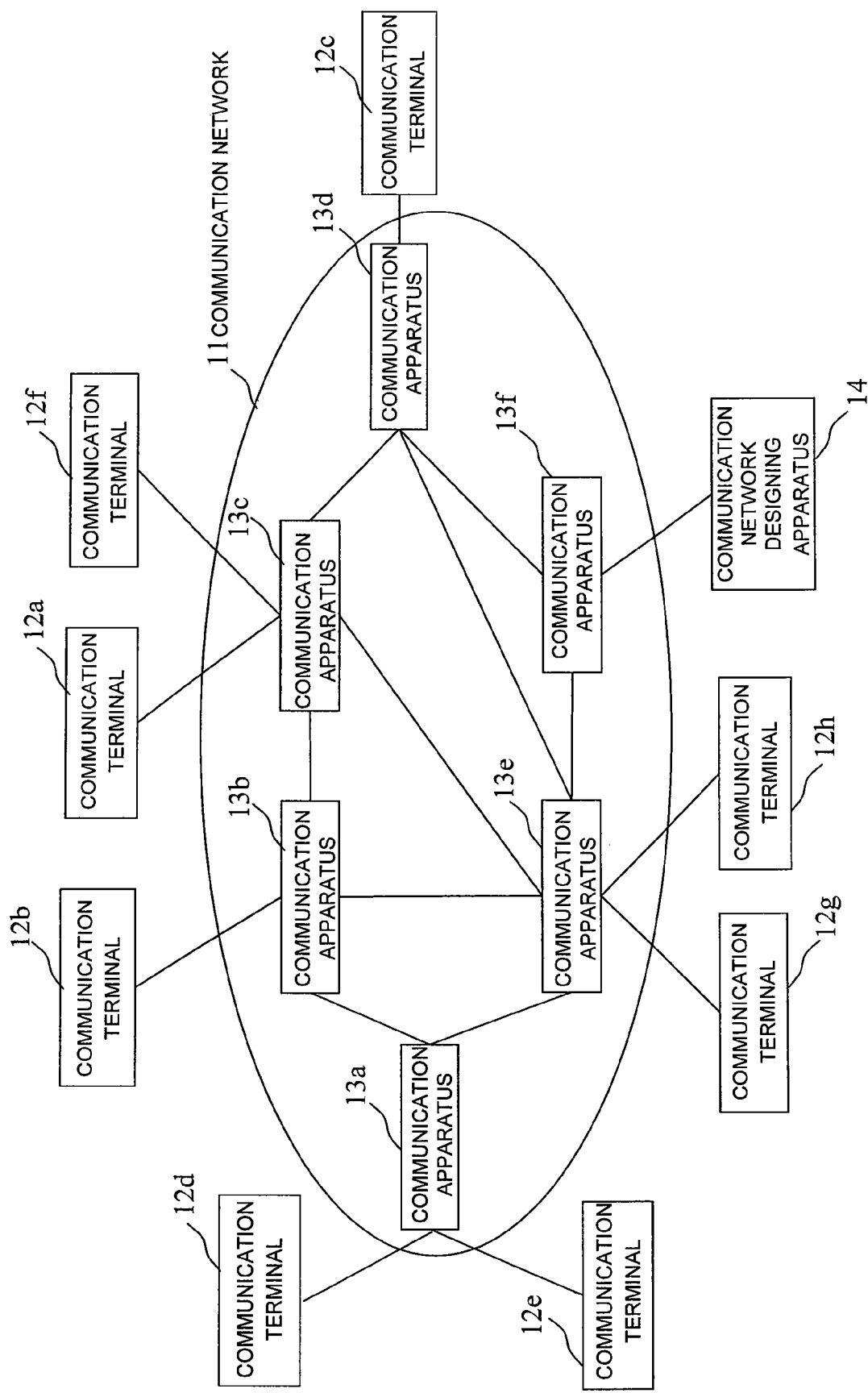
FIG. 1 is a schematic diagram of a communication network according to an embodiment.

11 Communication network
12 Communication terminal
13 Communication apparatus
14 Communication network designing apparatus
22, 24 Edge node
26 MPLS network
23 Core node
31 IP header
34 Label header
41 User interface
42 Information collecting unit
43 Information storing unit
44 Social network analyzing unit
45 Network designing unit
46 Network setting unit
51 Network database
52 User information database
81 User interface
82 Network information collection determining unit
83 Network information collecting unit
85 Network designing unit
86 Network database
87 Network setting unit
88 Communication network designing apparatus
89 Communication network
131 Label
132 Service class
133 S
134 TTL

BEST MODE FOR CARRYING OUT THE INVENTION

An embodiment of the present invention will be described below with reference to the accompanying drawings. The embodiment to be described below is a configuration of the present invention, and the present invention is not limited to the following embodiment.

FIG. 1 is a schematic diagram of a communication network according to the embodiment. Communication terminals 12a to 12h are connected through a communication network 11 structured such that communication apparatuses 13a to 13f are connected to each other by transmission paths. A communication network designing apparatus 14 is connected to the communication apparatuses 13a to 13f through the communication network 11. The communication network designing apparatus 14 is connected to the communication terminals 12a to 12h through the communication network 11.

The communication terminals 12a to 12h are terminals used by a user of the communication network 11. In the embodiment, as terminals used by users a to h (not shown), the communication terminals 12a to 12h are used. The communication terminals are communication terminals which acquire different pieces of identification information in units of users who uses the communication terminals. For this reason, although the communication terminals are physically identical machines, the communication terminals which are used by different users serve as different communication terminals.

The communication apparatuses 13a to 13f are network devices constitute the communication network 11, and transmit pieces of information to be transmitted or received by the communication terminals 12a to 12h. Some of the communication apparatuses 13a to 13f contains a communication terminal. For example, the communication apparatus 13a contains the communication terminal 12d and the communication terminal 12e. As the communication apparatuses 13a to 13f, nodes such as a router, a switch, a hub, and a VPN (Virtual Private Network) apparatus of which can be set the operations by the communication network designing apparatus 14 are known. More specifically, the communication network 11 may be a public network, a private network such as a LAN, or a virtual private network such as a VPN. The communication apparatuses 13a to 13f provide network information necessary for communication network design of the communication network designing apparatus 14 to the communication network designing apparatus 14.

The communication apparatuses 13a to 13f preferably provide information which can be used as social activity information and is useful for asocial network analysis and network information used by the communication network designing apparatus 14 as needed in response to a request from the communication network designing apparatus 14 or spontaneously by a program or the like to the communication network designing apparatus 14. For example, when the communication apparatus 13e receives a packet transmitted from the communication terminal 12d to the communication terminal 12c from the communication apparatus 13a and transmits the packet to the communication apparatus 13d, the communication apparatus 13e provides a transmission time and date of the packet, an address of transmission destination of the communication terminal 12d serving as a transmission source of the packet, an address of a transmission destination of the communication terminal 12c serving as a transmission destination of the packet, the communication apparatus 13a serving as a receiving source of the packet, the communication apparatus 13d serving as a transfer destination of the packet, the number of ports 1 which transmit the packet, and an amount of traffic of the packet to the communication network designing apparatus 14.

The communication network designing apparatus 14 is connected to the communication network 11 and executes the communication network designing method according to the embodiment. For example, the communication network designing apparatus 14 is connected to a computer for managing the communication network 11 serving as a management server of a provider which provides a service. The communication network designing apparatus 14 may be a hardware that executes the communication network designing method according to the embodiment. A program to execute the communication network designing method according to the embodiment may be caused to be executed by a computer and functioned as the communication network designing apparatus 14. The communication network designing program may be recorded on a computer readable recording medium.

Figure 2:
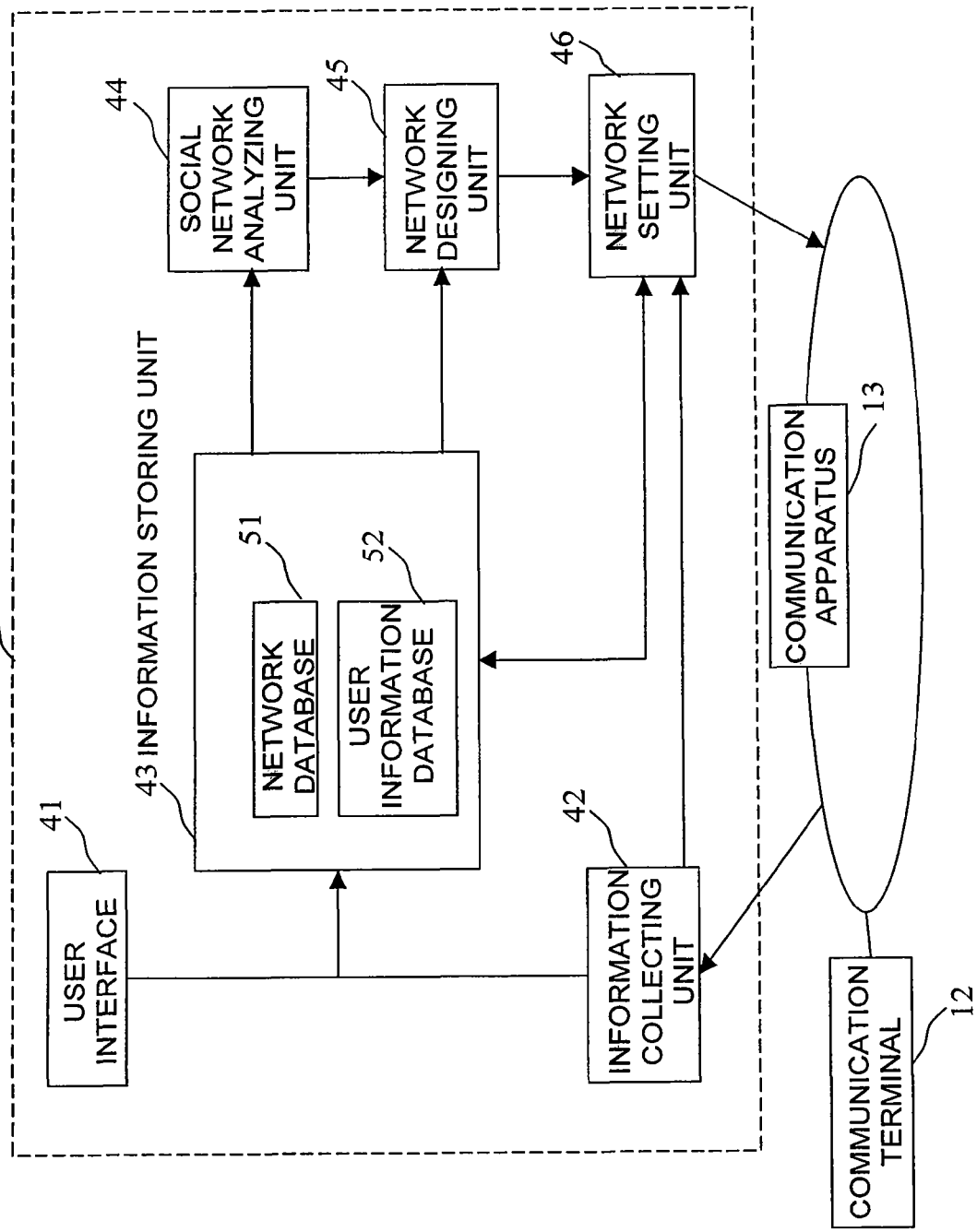
FIG. 2 is a block diagram showing an example of a communication network designing apparatus.

FIG. 2 is a block diagram showing an example of a communication network designing apparatus. The communication network designing apparatus 14 shown in FIG. 2 includes a user interface 41, an information collecting unit 42, an information storing unit 43, a social network analyzing unit 44, a network designing unit 45, and a network setting unit 46. The communication network designing apparatus 14 executes the information storing step of acquiring and storing social activity information representing associations between the communication terminals 12a to 12h on the communication network 11 by the information storing unit 43, the analyzing step of performing a social network analysis on the basis of the social activity information stored in the information storing step by the social network analyzing unit 44, the designing step of designing the communication network 11 on the basis of an analysis result of the social network analysis performed in the analyzing step by the network designing unit 45, and the setting step of setting the communication apparatus 13 to be the configuration of the communication network designed by the network setting unit 46 in the designing step.

The information storing unit 43 shown in FIG. 2 stores network information, user information, a demand request, a service request, and the like. The information storing unit 43 may acquire various pieces of information from the information collecting unit 42 or manually acquire the various pieces of information from the user interface 41.

The network information is information related to the communication apparatus 13, and includes the same management information used in a network management system. For example, when the communication apparatus 13e is used, a model number of the communication apparatus 13e, a serial number of the communication apparatus 13e, a setting of the communication apparatus 13e, a connection relation of the communication apparatus 13e, and a link capacity (used capacity and spare capacity) of a communication apparatus connected to the communication apparatus 13e are used. For example, as the setting of the communication apparatus 13e, the number of ports on a receiving side, the number of ports on a transmitting side, and the number of ports allocated to each transmission paths are used. For example, as the connection relation of the communication apparatus 13e, the communication apparatuses 13a, 13b, 13c, 13d, and 13f connected by the transmission paths and the contained communication terminals 12g and 12h are used. The network information preferably includes settings of the communication apparatuses 13 after the design is performed by the network designing unit 45. In this case, the network information is acquired from the network designing unit 45.

Furthermore, the network information includes a history of information transmitted by the communication apparatus 13. For example, when the communication apparatus 13e receives a packet transmitted from the communication terminal 12d to the communication terminal 12c from the communication apparatus 13a and transmits the packet to the communication apparatus 13d, the communication apparatus 13e provides a transmission time and date of the packet, an address of a transmission destination of the communication terminal 12d serving as a transmission source of the packet, an address of a transmission destination of the communication terminal 12c serving as a transmission destination of the packet, the communication apparatus 13a serving as a receiving source of the packet, the communication apparatus 13d serving as a transfer destination of the packet, the number of ports 1 which transmit the packet, and an amount of traffic of the packet.

The user information is information related to a user, and includes social activity information representing an association between users of the communication network 11. The social activity information is, for example, a combination between the communication terminals 12 which perform transmission/reception through the communication network 11. For example, in FIG. 1, when the communication terminal 12a forms a link with the communication terminal 12c to transmit and receive information, the social activity information of the communication terminal 12a includes a history of links such as a time and date at which an IP address and a link of the communication terminal 12b and an amount of traffic of transmitted and received information. The social activity information is, for example, a combination between a network group and the communication terminal 12 constituting the network group. In this case, the network group is a group configured by the plurality of communication terminals 12 on the communication network 11, and includes a network community. The network group may have a social networking site or may not have a social networking site. For example, in FIG. 1, a network group which mainly acts at a social networking site managed by the communication terminal 12f is present, the communication terminal 12a is a member of the networking group, or the social networking site is accessed. In this case, the social activity information of the communication terminal 12a includes identification information such as an IP address of the social networking site and a name of the networking group. The social activity information may include a history of past activities and a correlation to another user.

When the social network analyzing unit 44 extracts a set of communication terminals which form a complete graph, the network group includes a set of communication terminals extracted by the social network analyzing unit 44. The set of the communication terminals which form the complete graph is, for example, an affiliation network such as a clique or a clan. The affiliation network is a network that simultaneously expresses a connection between users and an activity state of the network group to which a user belongs to. An actual condition of the network group on the communication network can be recognized. The clique is a subset in which all target communication terminals are connected to each other by one link. When the clique analysis is performed to make it possible to extract a set of nodes which are tightly connected to each other. The clan is a clique having a radius N, and a subgraph having a distance of N or less.

Furthermore, the user information preferably includes authentication information of a user, network group information, and a status of a current user. The authentication information is information used to authenticate a user. For example, an ID, a password, or electronic authentication is used. Concrete examples of the network group information include, for example, a network group in which a user participates, a rank of the network group, and a history of participation. Concrete examples of the status of the current user includes, for example, position information of the current user, used terminal information, and a time stamp.

A demand request is a request to set various conditions used in the social network analyzing unit 44 and the network designing unit 45. For example, the demand request includes priorities of a user and a network group and information (member name, relation between members, and the like) of the network group which performs a social network analysis. When the demand request includes the plurality of specific communication terminals 12 and priorities of the communication terminals 12, the social network analyzing unit 44 weights a target of the demand request by a priority of the demand request to perform a social network analysis. The demand request includes a service class which is quality requested for the communication network 11, end-to-end quality (delay, band, and reliability) of a connected link, and an instruction of starting an operation of the communication network designing apparatus 14. The service request is a request transmitted from each communication terminal and information that requests formation of a link with another communication terminal. The service request includes information required to set formation of an inter-user link such as a user name or a network group name of a link destination.

In this case, the network information preferably has a database configuration distributed to a network database 51, and the user information preferably has a database configuration distributed to a user information database 52. In the embodiment, the user information includes social activity information representing an association between users. For this reason, the user information in the embodiment is highly secret, so that permission of an access must be limited. For this reason, when a database is independent of network information to which the social network analyzing unit 44, the network designing unit 45, and the network setting unit 46 refer and to which an outsider refers during maintenance of the communication network 11, an access rate can be increased by simplifying a table structure, and a secret of private information can be kept.

The social network analyzing unit 44 shown in FIG. 2 performs a social network analysis on the basis of the social activity information stored in the information storing unit 43. More specifically, the social network analyzing unit 44 executes the social network analyzing step. For example, the social network analyzing unit 44 acquires a combination between the communication terminals which perform transmission and reception through a communication network as social activity information from the information storing unit 43, and performs a social network analysis while defining the communication terminal 12 or a user thereof as a performer. The social network analyzing unit 44 acquires combinations between a network group configured by a plurality of communication terminals on the communication network and the communication terminals constituting the network group as social activity information, and performs the social network analysis while defining the network group, the communication terminals 12, a user of the communication terminals 12, or a combination therebetween as a performer. Furthermore, the social network analyzing unit 44 preferably performs the social network analysis after performing weighting depending on an amount of traffic. When a social network analysis developed as a tool which causes an organized activity to visualize is used while defining the communication terminal 12 or the network group as a performer, an inter-user association structured on the communication network 11 or an activity status of the network group can be recognized. The social network analyzing unit 44 can recognize influence given to an activity of the network group by a member of the network group on the basis of information such as a mail between members of the network group or a blog.

The social network analyzing unit 44 preferably calculate a centrality or a weakness of the social network to perform the social network analysis. In this case, the centrality of the social network is an index representing the degree of centrality of each of the communication terminal 12 or the degree of termination of the communication terminal in the social network formed on the communication network 11. The social network is a network that is connected such that the communication terminals 12 transmit and receive information on the communication network 11. The weakness of the social network is an index representing a magnitude of influence on the social network when a failure occurs in communication between the communication terminals or the network groups in the social network formed on the communication network 11.

The centrality of the social network includes, for example, a degree centrality calculated from the number of connections to which a specific node is directly connected, a betweenness which calculates the degree of an intermediary role held by a node such as a broker or a hub, and a flow centrality which calculates a total flow by applying a valued graph to an intermediary model. The degree centrality is a model on the basis of an idea that a multitude of associations of members in the network groups expresses the centrality. Since communication traffic (amount of traffic) is concentrated on a node having a high degree, the network designing unit 45 preferably increases a communication capacity of the node or preferably performs design such as a mirror server of the node is arranged. The betweenness is a model based on an idea that, when a node having a high betweenness is down, the activity of the entire network group is considerably influenced. Since the reliability of a node having a high betweenness is preferably set to be high, links from other nodes to the corresponding node are preferably formed in a multi-route manner or in a two-route manner by using a copy function.

The flow centrality is effectively used in not only the presence/absence of a connection but also weighting of an amount of traffic. Even though the number of times of formation of links does not change, a load on a communication network increases when an amount of traffic is large. In this case, when the priority of a link destination having a large amount of traffic is made high, or when a large transmission capacity is made available in advance, the communication network can be efficiently operated. This is because a "centrality of the social network" and a weakness of the social network can cope with user authentication such as a LAN (Local Area Network) or a VPN (Virtual Private Network) can be performed, in a network environment which a specific user can access, a connection between users substantially corresponds to formation of a link of the communication network 11, and design based on the "centrality of the social network" and the "weakness of the social network" can be performed as a condition set when priorities are determined in priority control or reliability control of the amount of traffic.

When the social network analysis between the users is performed, a friendship structured on the communication network 11 can be recognized. In this case, a range in which the social network analyzing unit 44 performs the social network analysis is defined as the communication terminals 12a to 12h. However, a social network analysis for a partial network or a personal network may be performed. When a demand request to the social network analysis such as weighting or the like in units of users is received by a user interface, the social network analyzing unit 44 preferably performs weighting in units of users in response to a demand request and then performs the social network analysis.

The social network analyzing unit 44 forms an adjacent matrix which directly represents a relation between the communication terminals 12 on the basis of the combinations of the communication terminals 12 stored in the information storing unit 43 and calculates the centrality or weakness of the social network configured by the plurality of communication terminals 12 on the basis of the adjacent matrix to preferably perform the social network analysis. For example, the social network analyzing unit 44 acquires all transmission/reception destination of the communication terminals 12a to 12h shown in FIG. 1 in a predetermined period as social activity information and calculates the centrality or weakness of the social network while defining the users of the communication terminals 12a to 12h as performers. In this case, when the information storing unit 43 stores amounts of traffic of transmission and reception of the communication terminals 12 in units of the communication terminal 12, the social network analyzing unit 44 preferably performs weighting depending on the amounts of traffic to the adjacent matrix. When the centrality of the social network is calculated on the basis of associations of the communication terminals 12a to 12h, what social network is constituted by the communication terminals 12a to 12h or who is a central figure of the social network can be clarified. When the weakness of the social network is calculated on the basis of the associations between the communication terminals 12a to 12h, who in the communication terminals 12a to 12h is an intermediary and form the social network can be clarified.

The social network analyzing unit 44 forms an adjacent matrix which directly represents a relation between the network group and the communication terminal on the basis of a combination between the network groups and the communication terminals stored in the information storing unit 43, and the centrality or weakness of the social network constituted by the plurality of communication terminals is preferably calculated on the basis of the adjacent matrix. For example, the social network analyzing unit 44 extracts the network group in which the communication terminals 12a to 12h shown in FIG. 1 participate, sums up the numbers of accesses in a predetermined period, and performs a social network analysis while defining the communication terminals 12a to 12h and the network groups as performers. When the information storing unit 43 stores amounts of traffic of transmission and reception of the communication terminals 12 in units of the communication terminal 12, the social network analyzing unit 44 preferably performs weighting depending on the amounts of traffic to the adjacent matrix. When the centrality of the social network is calculated on the basis of the associations between the network groups, what social network is configured by users of the communication terminals 12a to 12h and the network groups or who is a central figure of the social network can be clarified. When the weakness of the social network is calculated on the basis of the associations between the network groups, a user of the communication terminals 12a to 12h who take an intermediary role and the network group can be specified.

The social network analyzing unit 44 extracts a network group in which the communication terminals 12a to 12h shown in FIG. 1 participate, sums up the number of accesses in a predetermined period, and preferably performs a social network analysis while defining each of the network groups as a performer. When the centrality of the social network is calculated on the basis of associations between the network groups, what social network is configured the network groups or which network group is a center of the social network can be clarified. Furthermore, when the weakness of the network is calculated, a network group which takes an intermediary role can be specified.

Figure 3:
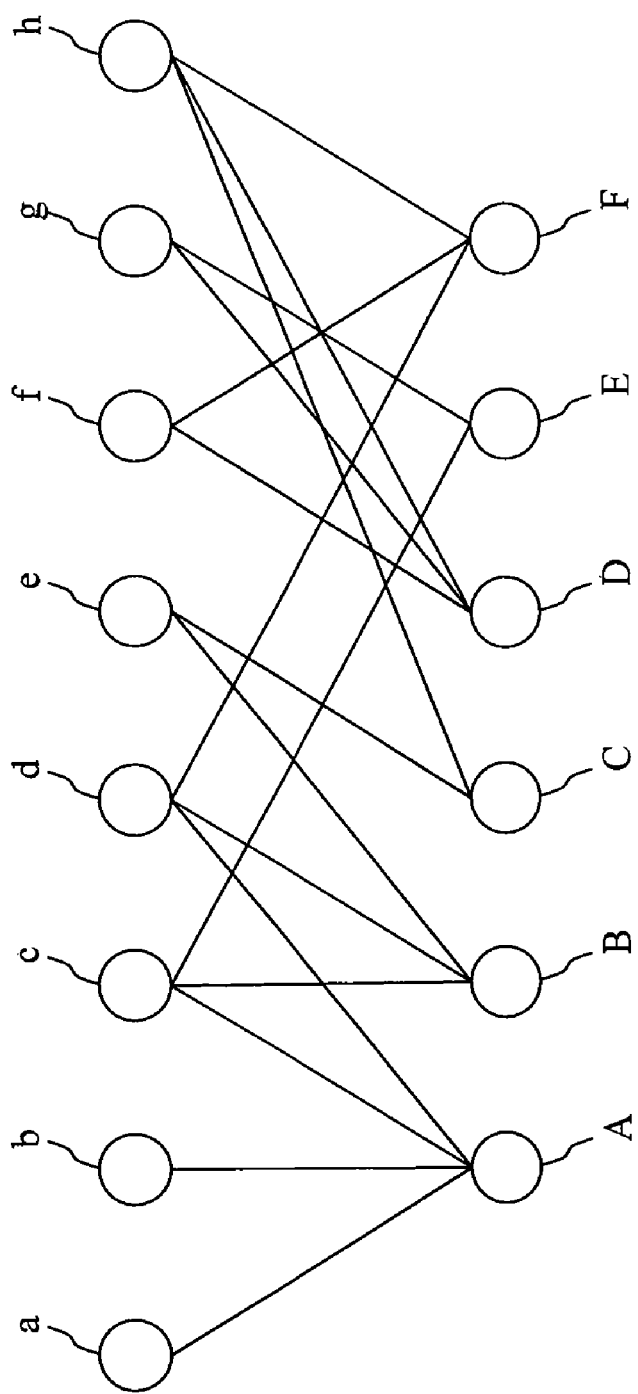
FIG. 3 is an explanatory diagram showing an example of a relation between a network group and a member thereof on the communication network.

An example of calculating a centrality and a weakness of a social network when combinations between network groups and communication terminals are used as social activity information will be described below. In the following explanation, the information storing unit 43 stores information not as the communication terminals 12 themselves but as social activity information of a user of the communication terminals 12. FIG. 3 is an explanatory diagram showing an example of a relation between the network groups and members thereof. There are eight users of the communication terminals 12, and the eight users separately belong to six network groups. Users a to h shown in FIG. 3 are users of the communication terminals 12a to 12h shown in FIG. 1 as described above. Users A to F shown in FIG. 3 are network groups in which the users a to h participate. Since an upper section and a lower section show individuals and network groups, the graph is called a two-section graph. When an adjacent matrix A based on the combinations between the network groups and the communication terminals is formed from the two-section graph, the adjacent matrix A can be given as described in Numerical Expression 1

[Numerical Expression 1]

$$A = \begin{pmatrix} 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 1 & 1 & 0 & 0 & 1 & 0 \\ 0 & 0 & 0 & 0 & 0 & 0 & 0 & 0 & 1 & 1 & 0 & 0 & 0 & 1 \\ 0 & 0 & 0 & 0 & 0 & 0 & 0 & 0 & 0 & 1 & 1 & 0 & 0 & 0 \\ 0 & 0 & 0 & 0 & 0 & 0 & 0 & 0 & 0 & 0 & 0 & 1 & 0 & 1 \\ 0 & 0 & 0 & 0 & 0 & 0 & 0 & 0 & 0 & 0 & 0 & 1 & 1 & 0 \\ 0 & 0 & 0 & 0 & 0 & 0 & 0 & 0 & 0 & 0 & 1 & 1 & 0 & 1 \\ 1 & 1 & 1 & 1 & 0 & 0 & 0 & 0 & 0 & 0 & 0 & 0 & 0 & 0 \\ 0 & 0 & 1 & 1 & 1 & 0 & 0 & 0 & 0 & 0 & 0 & 0 & 0 & 0 \\ 0 & 0 & 0 & 0 & 1 & 0 & 0 & 1 & 0 & 0 & 0 & 0 & 0 & 0 \\ 0 & 0 & 0 & 0 & 0 & 1 & 1 & 1 & 0 & 0 & 0 & 0 & 0 & 0 \\ 0 & 0 & 1 & 0 & 0 & 0 & 1 & 0 & 0 & 0 & 0 & 0 & 0 & 0 \\ 0 & 0 & 0 & 1 & 0 & 1 & 0 & 1 & 0 & 0 & 0 & 0 & 0 & 0 \end{pmatrix}$$

In general, the adjacent matrix A is a square matrix given by $(n+m) \times (n+m)$ to the number of individuals (n) and the number of network groups (m), and has a configuration divided into an individual section and a network group section. A degree centrality model will be described as a calculation of the centrality of the social network, and a betweenness model will be described as a calculation of a weakness of a social network.

(Degree Centrality Model)

The degree centrality model is a model based on an idea that a multitude of associations of members in the network groups expresses the centrality of the social network. When a matrix X expressed by an inner product $X = AA^T$ of the adjacent matrix A and a transposed matrix $A^T$, a degree centrality of the entire communication network of the two-section graph shown in FIG. 3 can be calculated.

[Numerical Expression 2]

$$X = \begin{pmatrix} 1 & 1 & 1 & 1 & 0 & 0 & 0 & 0 & 0 & 0 & 0 & 0 & 0 & 0 \\ 1 & 1 & 1 & 1 & 0 & 0 & 0 & 0 & 0 & 0 & 0 & 0 & 0 & 0 \\ 1 & 1 & 3 & 2 & 1 & 0 & 1 & 0 & 0 & 0 & 0 & 0 & 0 & 0 \\ 1 & 1 & 2 & 3 & 1 & 1 & 0 & 1 & 0 & 0 & 0 & 0 & 0 & 0 \\ 0 & 0 & 1 & 1 & 2 & 0 & 0 & 1 & 0 & 0 & 0 & 0 & 0 & 0 \\ 0 & 0 & 0 & 1 & 0 & 2 & 1 & 2 & 0 & 0 & 0 & 0 & 0 & 0 \\ 0 & 0 & 1 & 0 & 0 & 1 & 2 & 1 & 0 & 0 & 0 & 0 & 0 & 0 \\ 0 & 0 & 0 & 1 & 1 & 2 & 1 & 3 & 0 & 0 & 0 & 0 & 0 & 0 \\ 0 & 0 & 0 & 0 & 0 & 0 & 0 & 0 & 4 & 2 & 0 & 0 & 1 & 1 \\ 0 & 0 & 0 & 0 & 0 & 0 & 0 & 0 & 2 & 3 & 1 & 0 & 1 & 1 \\ 0 & 0 & 0 & 0 & 0 & 0 & 0 & 0 & 0 & 1 & 2 & 1 & 0 & 1 \\ 0 & 0 & 0 & 0 & 0 & 0 & 0 & 0 & 0 & 0 & 1 & 3 & 1 & 2 \\ 0 & 0 & 0 & 0 & 0 & 0 & 0 & 0 & 1 & 1 & 0 & 1 & 2 & 0 \\ 0 & 0 & 0 & 0 & 0 & 0 & 0 & 0 & 1 & 1 & 1 & 2 & 0 & 3 \end{pmatrix} = AA^T$$

A diagonal section of the matrix X given by Numerical Expression 2 is {1, 1, 3, 3, 2, 2, 2, 3, 4, 3, 2, 3, 2, 3}. This diagonal section is the degree centrality calculated from the entire communication network of the two-section graph shown in FIG. 3.

Furthermore, the matrix X is used to calculate an affiliation centrality of each user and an affiliation centrality of a network group, so that a user and an organization can also be independently evaluated. More specifically, of off-diagonal sections of the matrix X, the first to eighth columns corresponding to n columns express the number of network groups in which individual pairs commonly participate. More specifically, a sum of rows of the n columns expresses an amount of organizational activity of each individual. On the other hand, of an off-diagonal matrix of the matrix X, the total number of network groups of the ninth to fourteenth columns corresponding to m columns below the (n+1)th column. More specifically, a sum of rows of m columns below the (n+1)th column expresses an individual activity in each of the network groups.

Furthermore, a centrality of a social network calculated from the entire communication network is defined as model 1, and a centrality of a social network obtained by considering a network group and an individual as independent graphs is defined as model 2, so that a calculation result of a degree centrality in the social network shown in FIG. 3 is shown in FIG. 4. As priorities on design of a conventional communication network, a member having the largest number of connection links is preferentially operated when all participants are in the same rank. For this reason, when an amount of activity to the network group is considered, while it is thought that the user c and the user d and the user h are in the same rank at the same link number 3, it is understood that the user d is the top, the user c is the next, and the user h is after the next. More specifically, the user d is a most active user having the largest amounts of activity in both model 1 and model 2. Therefore, the network designing unit (reference numeral 45 in FIG. 2) preferably allocates a sufficient band or the number of links and is preferably configured to prepare a spare band or a spare link in a network environment which the user d accesses.

(Betweenness Model)

The betweenness model is a model based on a weakness of the two-section graph shown in FIG. 3. When the function of a certain user is down, and when the user takes an intermediary role, the function of the entire network group is remarkably down. For this reason, the betweenness model is based on an idea that the magnitude of the degree is set as a level of the centrality of the social network. More specifically, when the betweenness of the social network is calculated, the weakness of the social network can be calculated. The betweenness can be calculated by evaluating, for example, the total number of links provided between two points including a certain point therebetween. For example, this is described in "Shakai Network Bunseki no Kiso (Fundamental Social Network Analysis)" by Jun Kanemitsu, Keiso Shyobo (2003) in detail.

A calculation result of a betweenness in the social network shown in FIG. 3 is shown in FIG. 5. It is understood that the user d is the top in terms of the entire network and individual intermediation and has a maximum intermediary function. Therefore, it is understood that information from the user d preferably has a high priority, and a multi-link or double-link measure is preferably made. As another centrality, a flow centrality model based on a network flow obtained by giving not only a connection but also weighting using a communication traffic (amount of traffic) to the betweenness model can also be formed. This analysis result is a social network model structured on a communication network, and can be more effectively used as data to secure priority control reliability of the communication network.

In the explanation shown in FIG. 3, the centrality and weakness of the social network are calculated for each of the eight users who participate in the network group to perform a social network analysis. However, the users need not always participate in the network group, and the number of users to be analyzed is not limited to a specific number.

The network designing unit 45 shown in FIG. 2 designs a communication network on the basis of the analysis result of the social network analyzing unit 44. More specifically, the network designing unit 45 executes the designing step. For example, the network designing unit 45 designs a communication network such that, for example, the priority and reliability of information transmitted and received by the communication terminal 12 having a high centrality or weakness of a social network are made higher than those of information transmitted and received by the communication terminal 12 having a low centrality of the social network. The design which makes the priority or the reliability high includes a physical design and a logical design. For example, these designs includes a design which makes an order of transmission from a communication apparatus to a transmission path high, a design which decreases the number of links of transmission paths to cause information to reach a transmission destination, a multi-route design which increases the number of different routes of transmission paths transmitted from the communication apparatus, and a design which secures a large number of bands.

Figure 9:
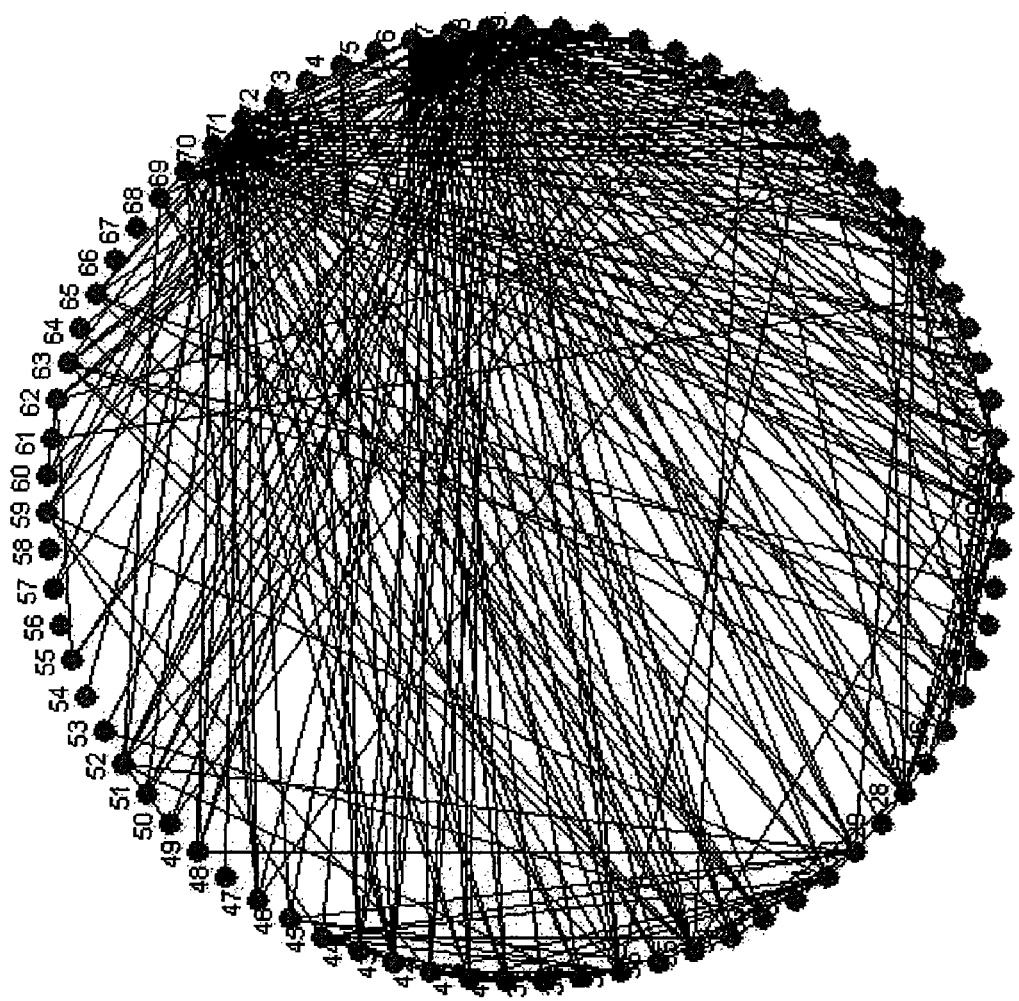
FIG. 9 is a connection diagram between all nodes.

In a school organization including three research groups, students, and a secretariat, an embodiment in which mail information accumulated in a mail server actually operated is analyzed will be described below. In this example, in consideration of the protection of personal information, only a mail header was targeted. Since spam mails were transmitted to the server, the spam mails were deleted, and a plurality of mail addresses used by the same person were specified, and corresponding mails are sorted out. As analyzing tools, Mathematica and Net Miner are used. FIG. 9 is a connection diagram between all nodes. A measurement period was two months, the total number of nodes was 79, and the total number of links was 441.

Figure 10:
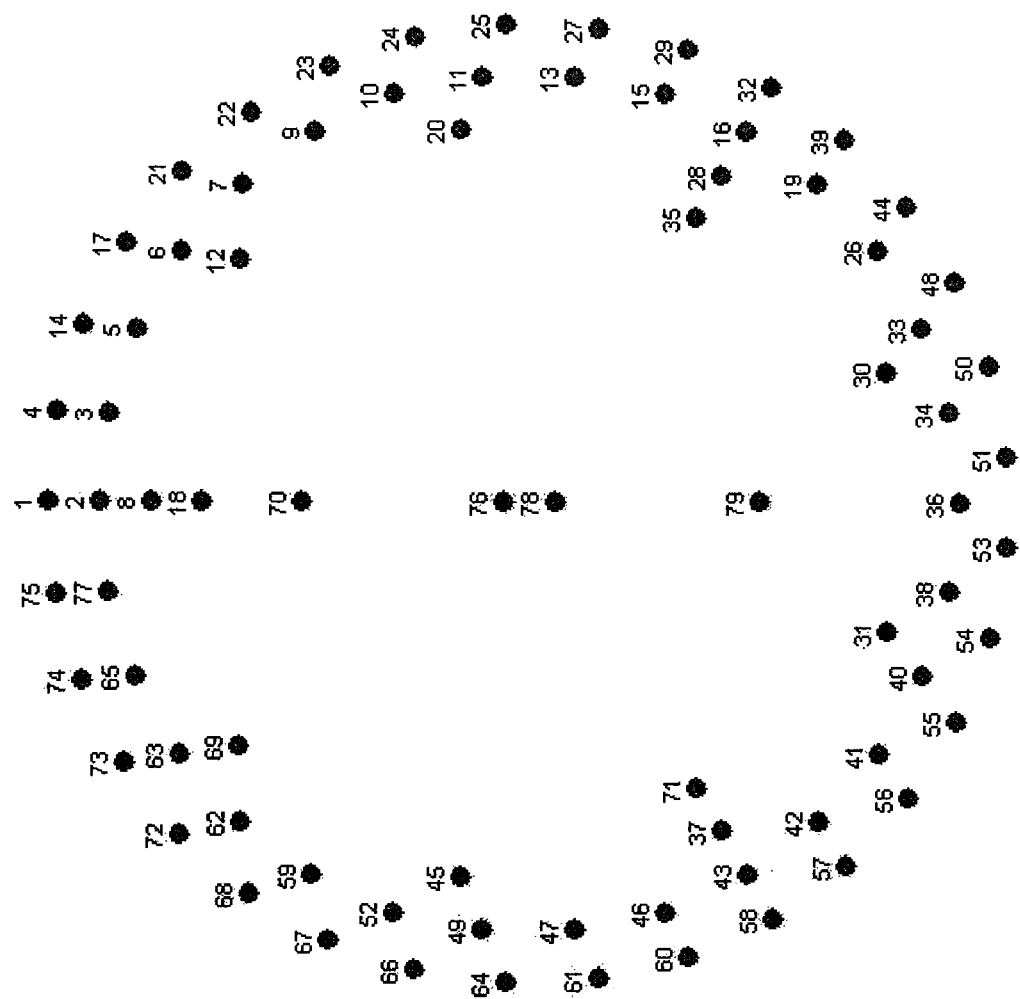
FIG. 10 is analysis data of a degree centrality targeted at an individual.

A difference between a social network which targets only individuals and an affiliation network will be described below. FIG. 10 is analysis data of an degree centrality obtained by using only individual as a target. A position which is closer to the center of a circle has a higher centrality, degree centralities of users are plotted on concentric circles each having an index of center as radius. In this result, the centralities of a user 78, a user 76, a user 70, and a user 79 of an executive section are very high. As the next group, a user 71, a user 18, a user 35, a user 30, a user 31, and the like have high centralities.

A degree centrality in the affiliation network was calculated. Since an actual condition of a network group on the communication network was necessarily recognized, a set of communication terminals constituting a complete graph was extracted, and characteristics of the extracted set were analyzed. In this manner, in the analyzing step, the social network analyzing unit 44 preferably extracts the set of communication terminals constituting the complete graph and handles the extracted set as a network group.

Figure 11:
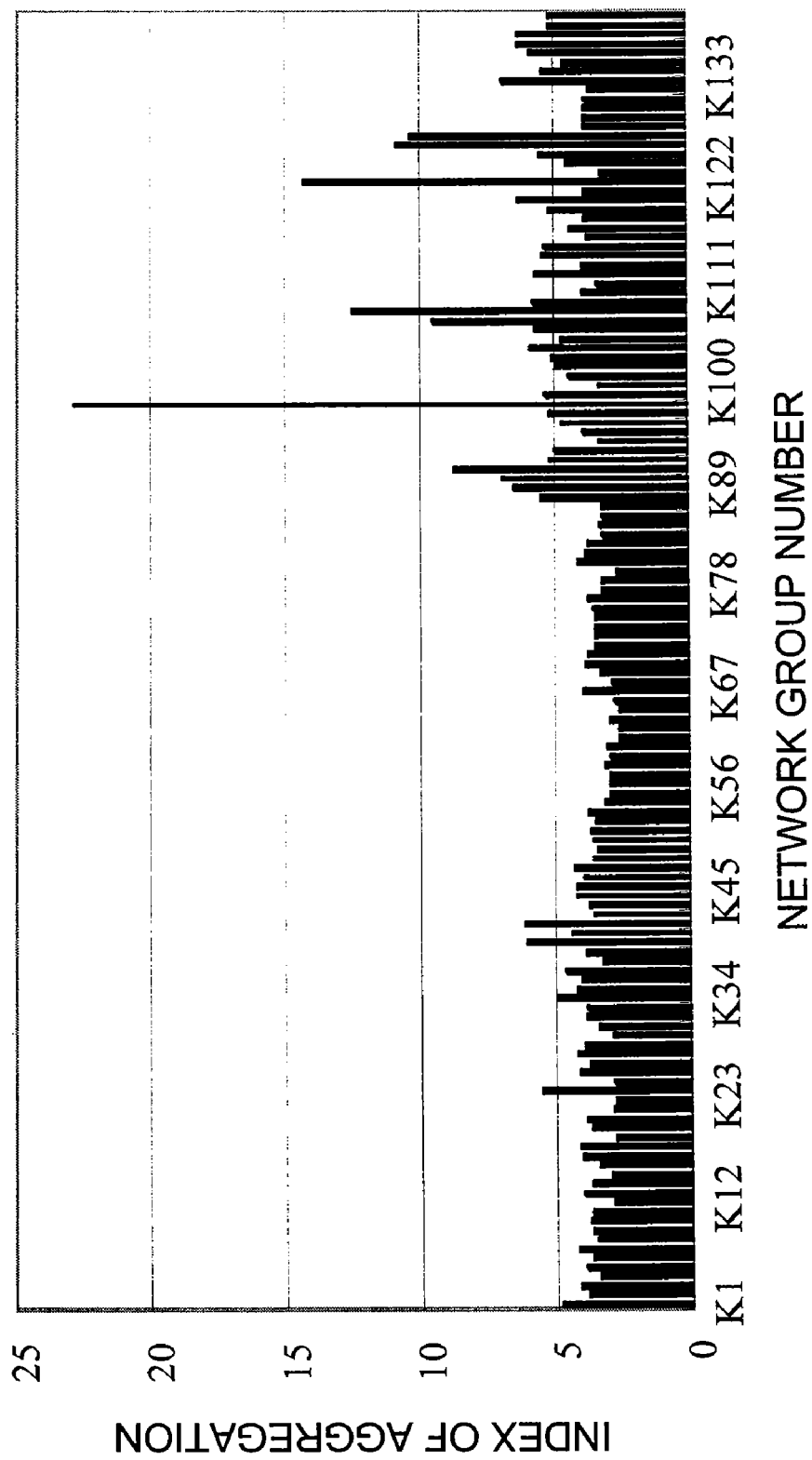
FIG. 11 is a graph showing an example of a clique characteristic.

FIG. 11 is a graph showing an example of a clique characteristic. FIG. 11 shows indexes of aggregation in units of network groups. In this example, the minimum size of the clique was set to 3. A total of 140 network groups were observed, and a network group includes one teacher having the maximum index of aggregation of 22.8 and two students. There were 29 network groups each having an index of aggregation of 5 or more. Most of the network groups were small network groups each including 3 to 6 persons. Although each of the network groups frequently included a member of the executive section, it was understood that there are a network group including only teachers according to an organizational basis and a member who had a connection between different organizations and operated.

In order to strengthen a connection in a network group and perform an analysis closer to an organizational activity, a clan analysis was performed. The longest distance was set to 2. It was understood that 34 clans constituting a network group including up to 50 participants to a network group including at least 6 participants were configured. Indexes of aggregation ranged from 1.50 to 4.23.

Figure 12:
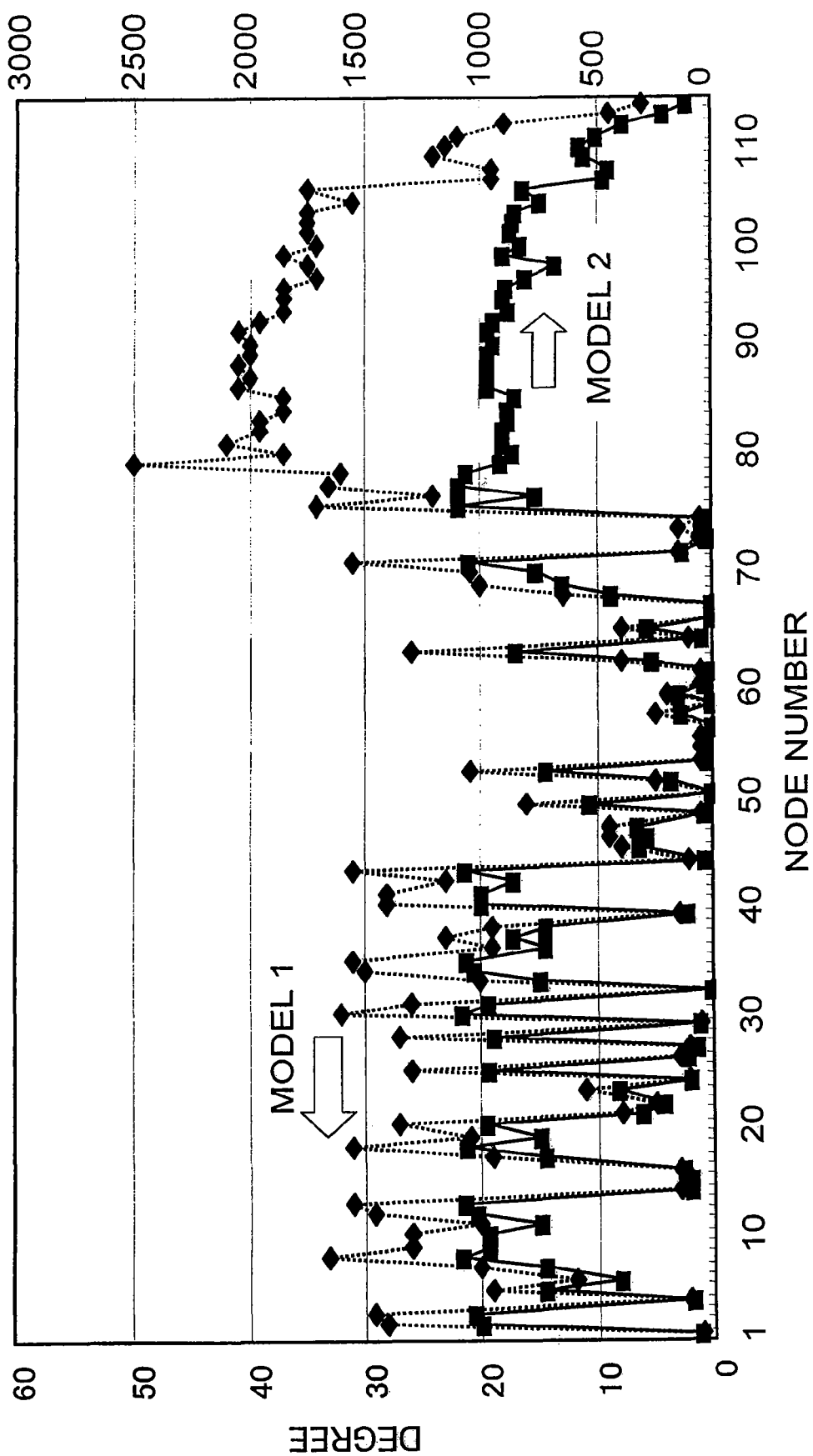
FIG. 12 shows a degree centrality of an affiliation network.

A two-section graph to express an affiliation network was formed on the basis of the configuration of the network groups and the member data obtained by the clan analysis result, and amounts of activity represented by organizations and individuals were calculated. FIG. 12 shows a degree centrality characteristic of the affiliation network. FIG. 12 shows two results of two models, i.e., a centrality (model 1) calculated from the entire communication network by using the two-section graph configured by the individuals and the organizations and a centrality (model 2) obtained when the individuals and the organizations are considered as different graphs. When model 1 and model 2 are compared with each other, a more detailed relation between the individuals and the organizations is apparent. Although both the characteristics are almost equal to each other, several characteristic features are observed. Although a user of node number 80 has the highest centrality of 50 in the analysis of model 1, the user has a centrality lower than those of the other nodes in the analysis of model 2. The user of node number 80 belongs to a group having a clan configuration. When the individuals and the organizations are separately analyzed, a node observed to be an organizational center includes users of node number 88 and node number 90. However, by an analysis using the entire two-section graph, it is understood that the activity of the user of node number 80 is perspectively maximally increased. In terms of a personal activity, although a user of node number 25 has a centrality almost equal to that of a user of node number 45 in model 2, the user of node number 25 has a centrality lower than that of the user of the node number 45 in model 1. More specifically, it is understood that the user of node number 25 cannot maximally use the organization.

A degree centrality obtained in consideration of only individuals shown in FIG. 10 was compared with a degree centrality analyzed as the affiliation network shown in FIG. 12. In both the analyses, users of the executive section have high centralities. However, FIG. 12 shows a trend to increase the centrality of a member belonging to a large number of network groups in members of research groups, especially, in a clique analysis. Ranks of centralities of some members of the research groups were exchanged in FIGS. 10 and 12 (for example, user 8 and user 18). This phenomenon may occur because a connection which is not included in a clan distribution in original connection data because the two-section graph is formed on the basis of the clan analysis result is deleted. However, data which is not matched with an organizational activity may be regarded as noise is deleted. More specifically, it is shown that specifying of an individual who takes the central role in the entire network through an organizational activity may be apparent by the affiliation network analysis.

When the network designing unit 45 acquires an analysis result of the social network analyzing unit 44, the network designing unit 45 acquires a current position of a user from user information stored in the information storing unit 43 and refers to network information stored in the information storing unit 43 to specify the communication apparatus 13 to be set to the corresponding user. In this case, only one communication apparatus 13 need not be used as the communication apparatus 13 to be set, the communication apparatuses 13 arranged in a predetermined region may be used. For example, a user of the communication terminal 12a in FIG. 1 may be set to not only the communication apparatus 13a but also the communication apparatuses 13b and 13e. The network designing unit 45 preferably determines settings of the communication apparatuses to satisfy a demand request accepted by the user interface 41. The network designing unit 45 may perform design with reference to the user information stored in the information storing unit 43. After the network designing unit 45 performs design for a necessary applied band or high reliability by a multi-route manner to links formed between the communication apparatuses 13, the network designing unit 45 outputs the designed network information to the network setting unit 46. The network designing unit 45 preferably stores the designed network information of the communication network 11 in the information storing unit 43.

The network setting unit 46 shown in FIG. 2 sets the communication network 11 on the basis of the network information designed by the network designing unit 45. For example, the settings may be performed such that the communication apparatus 13 is accessed to call setting information of the communication apparatuses 13. However, the settings of the communication apparatuses 13 may be performed such that instructions of setting change are transmitted to the communication apparatuses 13.

Figure 6:
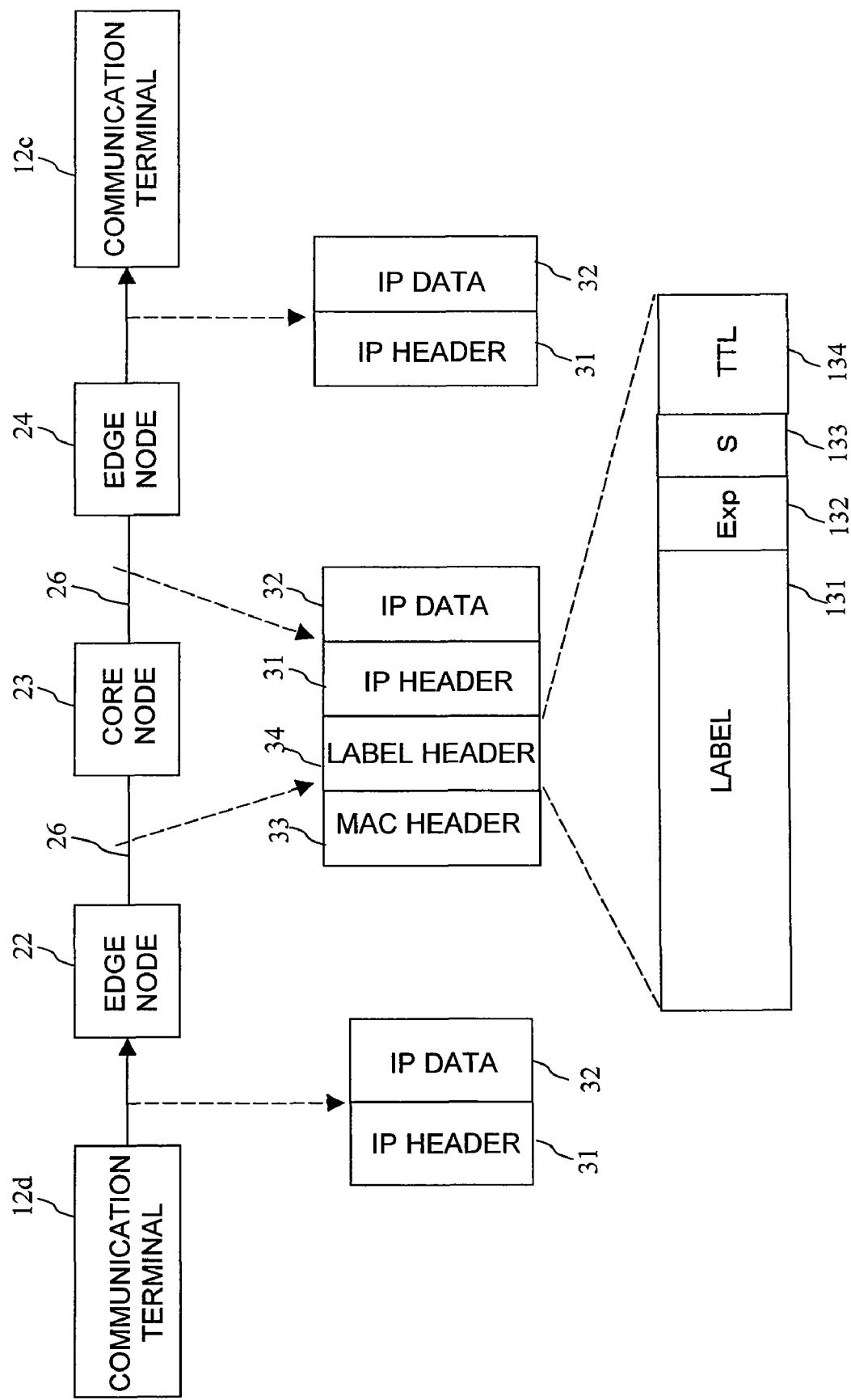
FIG. 6 is an explanatory diagram showing a setting of a network setting unit.

FIG. 6 is an explanatory diagram showing a setting by the network setting unit. The communication terminals 12d and 12c are connected to each other through a VPN (Virtual Private Network) using an MPLS (Multi-Protocol Label Switching) network 26 configured by an edge node (Label Edge Router) 22 which contains the communication terminal 12d, an edge node 24 which contains the communication terminal 12c, and a core node (Label Switch Router) 23 which handles an MPLS packet according to labels given by the edge nodes 22 and 24. In this case, as an example of a label format written by the edge node 22, a label 131, a service class 132 (EXP), an S (Bottom of Stack) 133, and a TTL (Time to Live) 134 are shown. The edge nodes 22 and 24 change a priority written in a label header 34 by an instruction from the network setting unit (reference numeral 46 in FIG. 2) depending on a user of the communication terminal 12d or a user of the communication terminal 12c. For example, the network setting unit (reference numeral 46 in FIG. 1) changes pieces of IP priority information to be written in the service class 132 in the MPLS label header 34 in units of users. Since priority setting for each user can be performed by a social network analysis, priority ranks can be increased by using a plurality of labels. When the communication terminal 12d transmits a packet, if the user of the communication terminal 12d has a high priority, the edge node 22 determines that the user has a high priority on the basis of a transmission source address described in an IP header 32 received from the communication terminal 12d to write the high priority in the label header 34. For example, the core node 23 transmits the packet to the edge node 24 according to the label header 34. At this time, when a setting to set a multi-route of transmission paths for a packet of the user of the communication terminal 12d is performed to the edge node 22, the packet is transmitted to a core node except for the core node 23. A routing setting from the user of the communication terminal 12d to the user of the communication terminal 12c is performed, the edge node 22 transmits a packet to the set core node 23.

Furthermore, when the communication terminals 12 transmit service requests which are requests to form a link to the communication network designing apparatus 14, the network setting unit 46 shown in FIG. 2 preferably sets the network such that the communication terminals 12 transmit service requests can communicate with each other. In this case, since the information collecting unit 42 receives the service request, the network setting unit 46 receives the service request from the information collecting unit 42.

Communication network design made in consideration of a centrality in a social network will be described below with reference to FIGS. 1 to 3. In this explanation, the eight users a to h in FIG. 3 have the communication terminals 12a to 12h, respectively, and the communication apparatuses 13a to 13f constitute an MPLS network. More specifically, the explanation will be made such that the communication apparatuses 13a and 13d are edge nodes and the communication apparatuses 13b, 13c, 13e, and 13f are core nodes. In an analysis result obtained by the social network analyzing unit in the embodiment, it is preferred in an organizational activity on the communication network 11 that the user d is a user who has the highest centrality of the social network and is active and most preferentially communicates a packet communicated from the communication terminal 12d. When a packet is transmitted to from the user d to the user c having a second largest amount of activity, the link is desirably formed such that delay is decreased by increasing a speed and a capacity and decreasing the number of core nodes. As a result, as a route, a route passing through one communication apparatus 13e is selected. The user e is also connected to the communication apparatus 13a used by the user d. The user d belongs network group A, network group B, and network group F. A level of importance of a packet transmitted by the user d changes depending on ranks set in the network groups A to F. On the other hand, the user e belongs network group B and network group C. When network group B is in the highest rank on the communication network 11, it is important that the user e communicates information to the user c, the user d, and the user e who are members of the network group B. Therefore, at an edge node to which the users of both network group B and network group C are connected, a low-priority packet of the user d is switched to a setting to form a low-speed small-capacity link. In contrast to this, a high-priority packet of the user e can also be switched to a setting to form a high-speed large-capacity link.

An analysis result of the social network analyzing unit 44 obtained as described above is further matched with the demand request given from the user interface 41 in the network designing unit 45, and actual communication network design is preferably executed. When a demand request from a network administrator is not matched with the result of the social network analysis, the priority in design of the social network analysis result is set to be higher than that of the demand analysis result, and the consistency of the operation is preferably maintained.

The communication network designing apparatus 14 preferably includes the information collecting unit 42 that collects various pieces of information of the communication network 11. The various pieces of information include network information, user information, and service request. Since the information collecting unit 42 preferably always acquires the various pieces of information on real time, the information collecting unit 42 preferably periodically acquires the various pieces of information. The information collecting unit 42 transmits an instruction to the communication apparatus 13 or the management server through the communication network 11 to collect the various pieces of information. When the network setting unit 46 may set the network to transmit the various pieces of information to the communication apparatus 13 in advance, and the information collecting unit 42 may receive the various pieces of information transmitted from the communication apparatus 13 to collect the various pieces of information. The information collecting unit 42 collects service requests by receiving information transmitted from the communication terminal 12. The information collecting unit 42 may acquire the effect that an application to the network group is written in a site from the management server of the site to collect the service request. The information collecting unit 42 stores the collected various pieces of information in the information storing unit 43.

The information collecting unit 42 preferably collects social activity information about the communication terminals. More specifically, the communication network designing method according to the embodiment preferably further includes the social activity information collecting step of collecting social activity information through the communication network 11 before the analyzing step. For example, the information collecting unit 42 collects information transmitted from the communication terminal 12 to the communication apparatus 13 from the communication apparatus 13. The information transmitted from the communication terminal 12 to the communication apparatus 13 is, for example, information included in header information of a packet. In this case, the information collecting unit 42 transmits a social activity information transmitting request representing that the social activity information is requested to the communication apparatus to transmit a transmission source and a transmission destination included in the header information of the packet received from the communication terminal 12 contained in the communication apparatus 13 or the transmission source, the transmission destination, and an amount of traffic to the communication apparatus 13, so that the information collecting unit 42 preferably collects the transmission source and the transmission destination or transmission source, the transmission destination, and the amount of traffic transmitted from the communication apparatus 13 as the social activity information. When the information collecting unit 42 collects the transmission source and the transmission destination of the packet, information representing a specific communication terminal with which the communication terminal 12 is associated can be collected as the social activity information. Furthermore, when the information collecting unit 42 collects the transmission source, the transmission destination, and the amount of traffic, the information collecting unit 42 can perform social network analysis in consideration of the amount of traffic. The social activity information is preferably stored in the information storing unit 43 in units of communication terminals. In this case, the information collecting unit 42 preferably outputs identification information such as a name or an address representing a destination communication terminal which transmits, receives, or transmits/receives and identification information such as a name or an address representing a network group which participates by registration or the like to the information storing unit 43 in units of the communication terminals.

The information collecting unit 42 may collect the social activity information from a server connected to the communication network 11. For example, when the server is an electronic mail server, the information collecting unit 42 collects a history of personal electronic mails or file transfer information. When the server is a server of a social networking site, the information collecting unit 42 collects a log-in communication terminal, a log-in count, a time, and the number of times of writing in the social networking site. The information collecting unit 42 may collect the social activity information by collecting information or an attached file given to a mail header of a transmitted/received electronic mail. For example, the information collecting unit 42 collects a transmission destination given to "To" of the mail header and a title of a mail given to "Subject". The information collecting unit 42 may collect the social activity information by performing questionnaire survey by using a server arranged in the communication network 11. In this manner, since the information collecting unit 42 automatically collects the social activity information, the social network analyzing unit 44 can clarify an actual condition of the social network structured in the communication network 11 on real time. In this manner, a social association of a user can be reflected on design of the communication network on real time.

The user interface 41 shown in FIG. 2 accepts an external input. For example, the user interface 41 accepts not only network information and user information input by a network administrator but also a demand request and a service request to set various conditions in communication network design. The demand request mentioned here includes not only a demand request used by the social network analyzing unit 44 but also a demand request used by the network designing unit 45. For example, when an instruction which starts an operation of the communication network designing apparatus 14 is received by the user interface 41 as a demand request, the network designing unit 45 performs communication network design according to the demand request. When the user interface 41 receives a priority of the communication terminal 12 as a demand request, the information storing unit 43 stores the demand request in the communication terminal 12 as social activity information.

Figure 7:
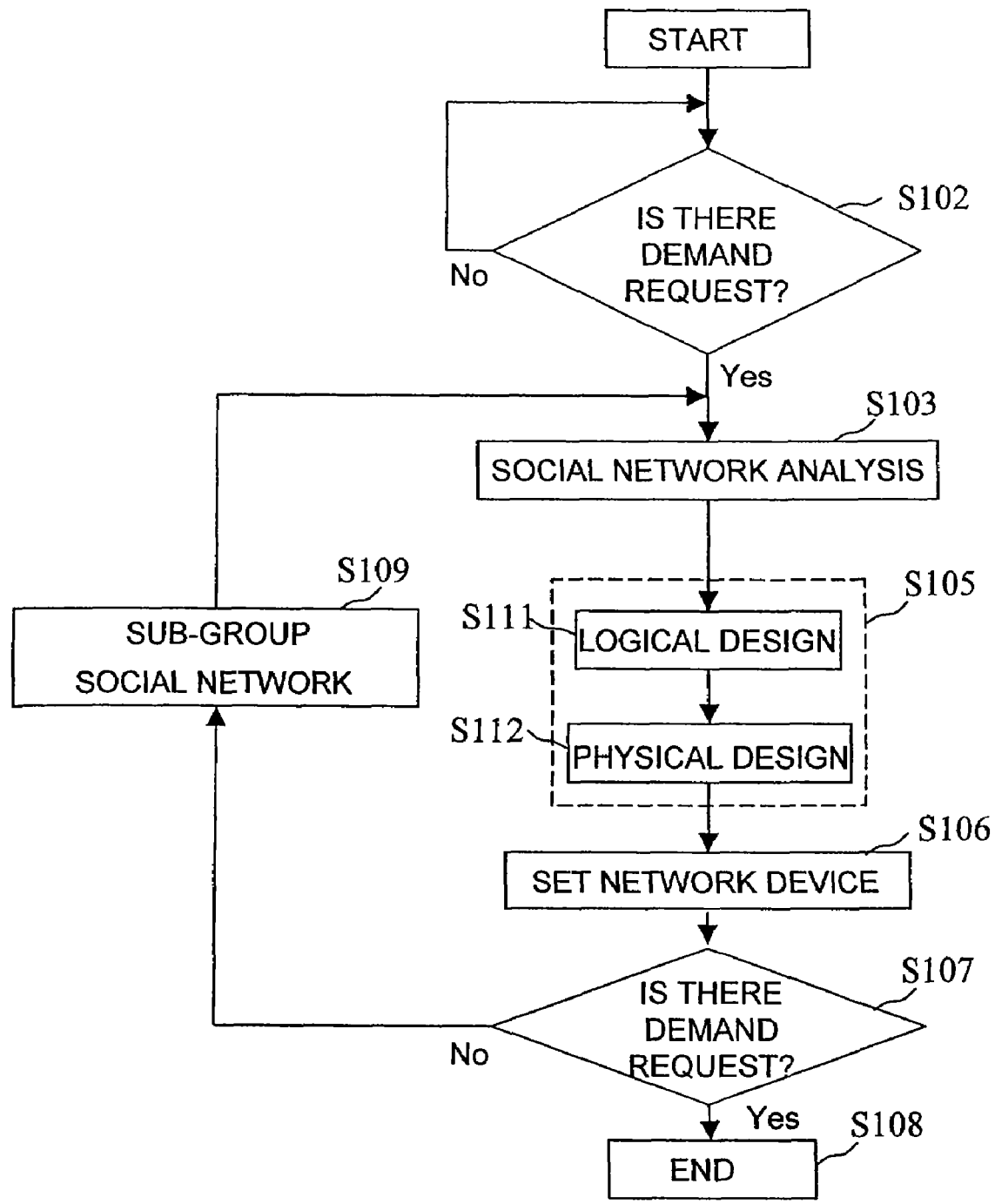
FIG. 7 is a flow chart showing an example of a communication network designing method according to the embodiment.
Figure 8:
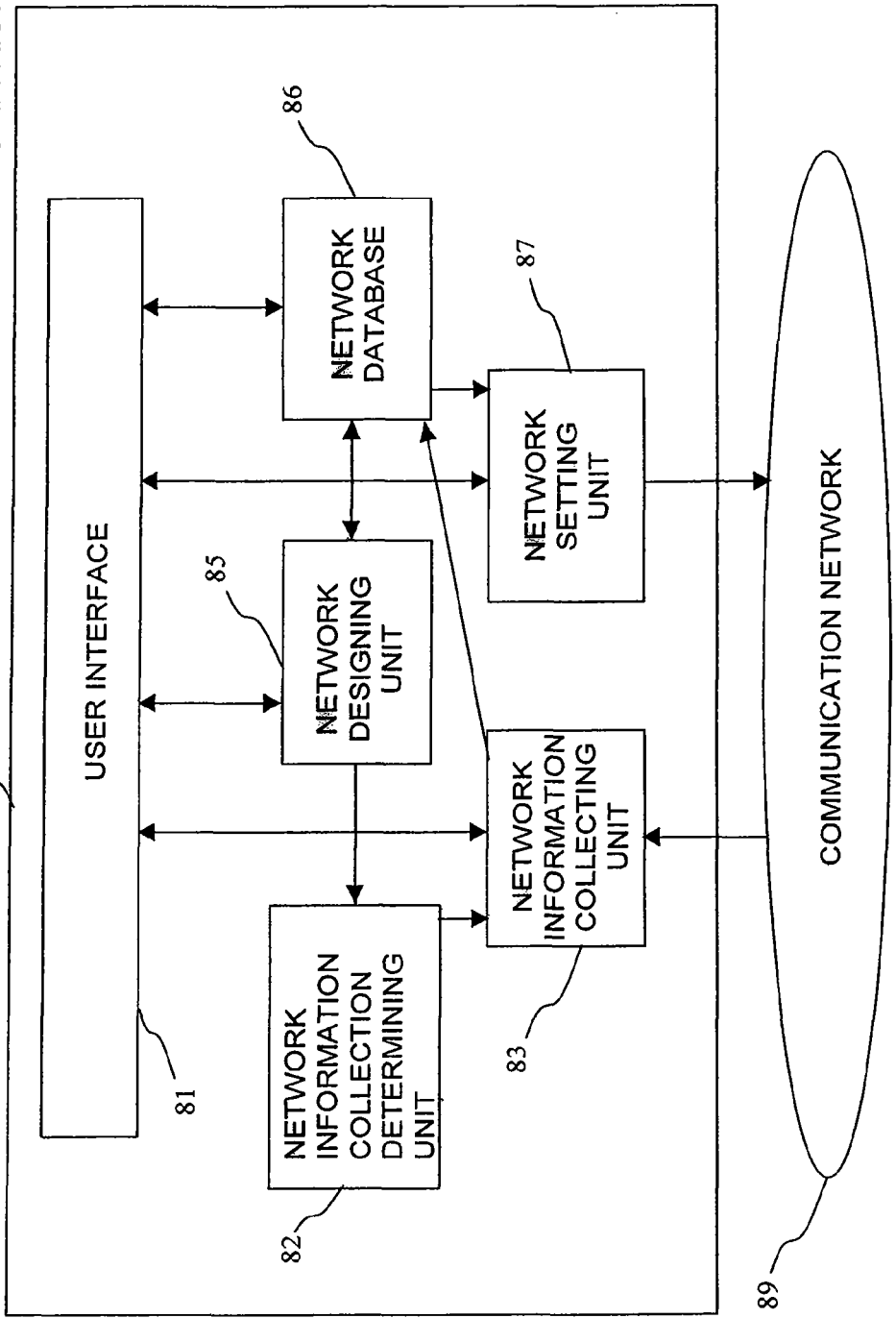
FIG. 8 is a block diagram showing an example of a conventional communication network designing system.

An example of a flow of communication network design will be described below with FIGS. 2 and 7. FIG. 7 is a flow chart showing an example of the communication network designing method according to the embodiment. When the user interface 41 accepts a demand request representing that the communication network design is performed (S102), the social network analyzing unit 44 performs a social network analysis (S103).

When the social network analyzing unit 44 finishes the social network analysis, the network designing unit 45 performs communication network design in which the analysis result of the social network analysis (S103) is reflected on a network configuration (S105). In this case, since the information collecting unit 42 according to the embodiment always collects user information including social activity information required for the social network analysis and network information required for design of the communication network 11, in the communication network design (S105), design can be performed on the basis of the latest network configuration of the communication network 11. In the communication network design (S105), logical design (S111) which designs logical items such as formation of a link, a path and a transmission capacity, and physical design (S112) which designs physical items such as a transmission route and a transmission line are preferably performed. In the communication network design (S105), any one of the logical design (S111) and the physical design (S112) may be performed. However, when both the designs are performed, the effect of the social network analysis (S103) can be further reflected on the communication network design (S105).

When design is performed within a range in which a setting can be changed while operating the communication network 11, the network configuration of the communication network 11 can be optimized without stopping the function of the communication network 11. When spare routes for setting the communication apparatuses 13 are arranged with respect to the communication apparatuses 13 in advance, the network configuration can be optimized without deteriorating communication quality of the communication network 11.

Upon completion of the communication network design (S105) in the network designing unit 45, the network setting unit 46 sets the communication apparatus 13 according to the communication network design (S105) (S106). In the setting of the communication apparatus 13 (S106), upon completion of the settings of all the communication apparatuses 13, it is checked whether the user interface 41 accepts a demand request representing that the communication network design is finished (S107). When the user interface 41 accepts the demand request representing that the communication network design is finished (S107), the communication network designing apparatus 14 finishes the design (S108). On the other hand, when the user interface 41 does not accepts the demand request representing that the communication network design is performed (S107), the social network analyzing unit 44 divides a range to be analyzed by the social network analysis (S103) into sub-groups (S109) and performs the social network analysis (S103) again. The social network analyzing unit 44 preferably performs sub-grouping (S109) by dividing or limiting a range of the social network analysis depending on the centrality or the weakness of the communication terminal subjected to the social network analysis (S103).

As described above, a social network analysis is performed on the basis of an association between the communication terminals on the communication network 11, so that an actual using state of the social network structured on the communication network 11 can be correctly recognized. When the communication network design is performed on the basis of an analysis result of the social network analysis, communication network design based on an actual condition of the social network structured on the communication network 11 can be performed. Therefore, excessive infrastructures prepared to prevent a network failure can be made streamlined. Furthermore, since the network configuration can be easily changed depending on an actual using state of the network, a network failure can be effectively prevented even though the volume of contents becomes large.

INDUSTRIAL APPLICABILITY

Since the present invention can perform a countermeasure against a communication network failure or a reduction in cost by software, the present invention can meet wide-range requests such as a reduction in cost by making infrastructures streamlined, further strengthening of security by a flexible change of a network configuration, or improvement of communication quality. Furthermore, since a social activity of each user can be analyzed, the present invention can also be used in network security to prevent interception or attack to a specific user.

The invention claimed is:

1. A communication network designing method in that a communication network having a communication apparatus which contains a communication terminal and a transmission path which connects the plurality of communication apparatuses to each other is designed by a communication network designing apparatus connected to the communication network, said method comprising:

an information storing step of acquiring and storing social activity information representing an association between the communication terminals to each other on the communication network by an information storing unit of the communication network designing apparatus;

an analyzing step of performing a social network analysis by a social network analyzing unit of the communication network designing apparatus on the basis of the social activity information stored in the information storing step; and a designing step of designing the priority and reliability of the communication terminal by a network designing unit of the communication network designing apparatus on the basis of an analysis result of the social network analysis performed in the analyzing step.

2. The communication network designing method according to claim 1, further comprising:

a social activity information collecting step of collecting the social activity information from the communication apparatus through the communication network by an information collecting unit of the communication network designing apparatus before the information storing step, and wherein in the information storing step, the information storing unit acquires and stores the social activity information collected in the social activity information collecting step from the information collecting unit.

3. The communication network designing method according to claim 2, wherein in the social activity information collecting step, the information collecting unit transmits a social activity information transmission request representing that the social activity information is requested to the communication apparatus to transmit a transmission source and a transmission destination included in header information of a packet received from the communication terminal contained in the communication apparatus, and the transmission source and the transmission designation transmitted from the communication apparatus are collected as the social activity information.

4. The communication network designing method according to claim 3, wherein in the social activity information collecting step, the information collecting unit transmits a social activity information transmission request representing that the social activity information is requested to the communication apparatus to transmit an amount of traffic included in header information of a packet received from the communication terminal contained in the communication apparatus together with the transmission source and the transmission destination, and the transmission source, the transmission destination and the amount of traffic transmitted from the communication apparatus are preferably collected as the social activity information.

5. The communication network designing method according to claim 1, wherein in the information storing step, the information storing unit stores combinations between the communication terminals which perform transmission/reception through the communication network as the social activity information in units of the communication terminals, and wherein in the analyzing step, the social network analyzing unit forms an adjacent matrix directly representing a relation between the communication terminals on the basis of a combination between the communication terminals and calculates a centrality of the social network formed by the plurality of communication terminals on the basis of the adjacent matrix to perform the social network analysis.

6. The communication network designing method according to claim 5, wherein in the designing step, the network designing unit, with respect to the communication apparatus which contains the communication terminal having the high centrality calculated in the analyzing step, in comparison with the communication terminal having the low centrality calculated in the analyzing step, designs the communication network which makes an order of performing transmission from the communication apparatus to the transmission path higher, increases the number of different routes of the transmission path transmitted from the communication apparatus, decreases the number of links of the transmission path to a transmission destination, or arranges a mirror server.

7. The communication network designing method according to claim 5, wherein in the information storing step, the information storing unit stores amounts of traffic of transmission/reception of the communication terminals in units of the communication terminals, and wherein in the analyzing step, the social network analyzing unit performs weighting depending on the amounts of traffic to the adjacent matrix.

8. The communication network designing method according to claim 1, wherein in the information storing step, the information storing unit stores combinations between network groups configured by the plurality of communication terminals on the communication network and the communication terminals constituting the network group as the social activity information in units of the communication terminals, and wherein in the analyzing step, the social network analyzing unit forms an adjacent matrix which directly represents a relation between the network group and the communication terminal on the basis of the combination between the network group and the communication terminal and calculates a centrality of the social network formed by the plurality of communication terminals on the basis of the adjacent matrix to analyze the social network.

9. The communication network designing method according to claim 8, wherein in the analyzing step, the social network analyzing unit extracts a set of communication terminals which form a complete graph, and the extracted set is handled as the network group.

10. The communication network designing method according to claim 8, wherein in the designing step, the network designing unit, with respect to the communication apparatus which contains the communication terminal having the high centrality calculated in the analyzing step, in comparison with the communication terminal having the low centrality calculated in the analyzing step, designs the communication network which makes an order of performing transmission from the communication apparatus to the transmission path higher, increases the number of different routes of the transmission path transmitted from the communication apparatus, decreases the number of links of the transmission path to a transmission destination, or arranges a mirror server.

11. The communication network designing method according to claim 8, wherein in the information storing step, the information storing unit stores amounts of traffic of transmission/reception of the communication terminals in units of the communication terminals, and wherein in the analyzing step, the social network analyzing unit performs weighting depending on the amounts of traffic to the adjacent matrix.

12. The communication network designing method according to claim 1, wherein in the information storing step, the information storing unit stores, as the social activity information, combinations between the communication terminals which perform transmission/reception through the communication network in units of the communication terminals, and wherein in the analyzing step, the social network analyzing unit forms an adjacent matrix which directly represents a relation between the communication terminals on the basis of the combination between the communication terminals and calculates a weakness of the social network formed by the plurality of communication terminals on the basis of the adjacent matrix to perform the social network analysis.

13. The communication network designing method according to claim 12, wherein in the designing step, the network designing unit, with respect to the communication apparatus which contains the communication terminal having the high weakness calculated in the analyzing step, in comparison with the communication terminal having the low weakness calculated in the analyzing step, makes an order of performing transmission from the communication apparatus to the transmission path high or increases the number of different routes of the transmission paths transmitted from the communication apparatus to design the communication network.

14. The communication network designing method according to claim 12, wherein in the information storing step, the information storing unit stores amounts of traffic of transmission/reception of the communication terminals in units of the communication terminals, and wherein in the analyzing step, the social network analyzing unit performs weighting depending on the amounts of traffic to the adjacent matrix.

15. The communication network designing method according to claim 1, wherein in the information storing step, the information storing unit stores, as the social activity information, combinations between a network group configured by the plurality of communication terminals on the communication network and the communication terminals constituting the network group in units of the communication terminals, and wherein in the analyzing step, the social network analyzing unit forms an adjacent matrix which directly represents a relation between the network group and the communication terminals on the basis of a combination between the network group and the communication terminal, and a weakness of a social network formed by the plurality of communication terminals is calculated on the basis of the adjacent matrix to perform the social network analysis.

16. The communication network designing method according to claim 15, wherein with respect to the communication apparatus which contains the communication terminal having the high weakness calculated in the analyzing step, in comparison with the communication terminal having the low weakness calculated in the analyzing step, makes an order of performing transmission from the communication apparatus to the transmission path high or increases the number of different routes of the transmission paths transmitted from the communication apparatus to design the communication network.

17. The communication network designing method according to claim 15, wherein in the information storing step, the information storing unit stores amounts of traffic of transmission/reception of the communication terminals in units of the communication terminals, and wherein in the analyzing step, the social network analyzing unit performs weighting depending on the amounts of traffic to the adjacent matrix.

18. A communication designing apparatus to execute the communication network designing method according to claim 1.

19. A non-transitory computer-readable medium that embodies the software to execute the communication network designing method according to claim 1.

* * * * *